United States Patent
Sugaya

(10) Patent No.: US 10,642,920 B2
(45) Date of Patent: May 5, 2020

(54) SYSTEM, METHOD, AND PROGRAM FOR SEARCH

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/753,622

(22) PCT Filed: Mar. 30, 2017

(86) PCT No.: PCT/JP2017/013261
§ 371 (c)(1),
(2) Date: Feb. 20, 2018

(87) PCT Pub. No.: WO2018/179228
PCT Pub. Date: Oct. 4, 2018

(65) Prior Publication Data
US 2020/0012696 A1    Jan. 9, 2020

(51) Int. Cl.
*G06F 16/00* (2019.01)
*G06F 16/958* (2019.01)
(Continued)

(52) U.S. Cl.
CPC ........ *G06F 16/958* (2019.01); *G06F 16/9038* (2019.01); *G06F 16/90324* (2019.01);
(Continued)

(58) Field of Classification Search
CPC .............. G06F 16/958; G06F 16/9038; G06F 16/9577; G06F 16/9535; G06F 16/90324;
(Continued)

(56) References Cited

U.S. PATENT DOCUMENTS 7,392,278 B2 *  6/2008  Chen ................... G06F 16/9535
7,512,551 B2 *  3/2009  Postrel ................. G06Q 20/06
                                                        705/26.35
(Continued)

FOREIGN PATENT DOCUMENTS

JP    2003-122754    4/2003
JP    2003-157283    5/2003
(Continued)

OTHER PUBLICATIONS

Google Advanced Search, https://www.google.co.jp/advanced_search, Feb. 20, 2018.

*Primary Examiner* — Noosha Arjomandi
(74) *Attorney, Agent, or Firm* — Lex IP Meister, PLLC

(57) ABSTRACT

The system for search of the present invention includes a search engine, a web site server, and a terminal. The control unit of the terminal performs the input receiving module to receive the predetermined keyword and argument input from the user. The control unit of the search engine performs the web site specifying module to specify the web site relating to the keyword and the argument that the terminal has received as the web site server. The control unit of the terminal performs the argument-related page display module and displays the page relating to the argument of the web site on the image display unit.

11 Claims, 4 Drawing Sheets

(51) Int. Cl.
*G06F 16/9038* (2019.01)
*G06F 16/957* (2019.01)
*G06F 16/9535* (2019.01)
*G06F 16/9032* (2019.01)
*G06F 16/951* (2019.01)

(52) U.S. Cl.
CPC ........ *G06F 16/951* (2019.01); *G06F 16/9535* (2019.01); *G06F 16/9577* (2019.01)

(58) Field of Classification Search
CPC ........ G06F 16/951; G06F 16/24; G06F 16/33; G06F 16/835; G06F 16/00
See application file for complete search history.

(56) References Cited

U.S. PATENT DOCUMENTS

| | | | | |
|---|---|---|---|---|
| 8,799,276 | B1* | 8/2014 | Hyatt | G06F 16/9535 |
| | | | | 707/723 |
| 9,268,859 | B2* | 2/2016 | Pobbathi | G06F 16/9535 |
| 10,404,662 | B1* | 9/2019 | Ben-Dor | H04L 67/025 |
| 10,534,851 | B1* | 1/2020 | Chan | G06F 40/14 |
| 2004/0039733 | A1* | 2/2004 | Soulanille | G06Q 30/0241 |
| 2006/0248078 | A1* | 11/2006 | Gross | G06F 16/3322 |
| 2007/0067267 | A1* | 3/2007 | Ives | G06F 16/951 |
| 2008/0301562 | A1* | 12/2008 | Berger | G06F 16/958 |
| | | | | 715/733 |
| 2009/0167553 | A1* | 7/2009 | Hong | G06Q 10/02 |
| | | | | 340/4.61 |
| 2011/0071915 | A1* | 3/2011 | Lee | G06Q 30/02 |
| | | | | 705/26.1 |
| 2014/0344306 | A1* | 11/2014 | Bowden | G06F 16/9535 |
| | | | | 707/769 |
| 2015/0193546 | A1* | 7/2015 | Lipton | G06F 9/445 |
| | | | | 717/178 |
| 2015/0379571 | A1* | 12/2015 | Grbovic | G06Q 30/0256 |
| | | | | 705/14.54 |
| 2016/0132596 | A1* | 5/2016 | Harris | G06F 21/6227 |
| | | | | 707/722 |
| 2016/0188684 | A1* | 6/2016 | Glover | G06F 16/951 |
| | | | | 707/722 |
| 2016/0373891 | A1* | 12/2016 | Ramer | H04W 4/029 |
| 2017/0111467 | A1* | 4/2017 | Zhang | G06F 40/14 |
| 2020/0012696 | A1* | 1/2020 | Sugaya | G06F 16/9038 |
| 2020/0051376 | A1* | 2/2020 | Lutnick | G07F 17/3237 |

FOREIGN PATENT DOCUMENTS

| | | |
|---|---|---|
| JP | 2007-323394 | 12/2007 |
| JP | 2010-267075 | 11/2010 |

* cited by examiner

FIG. 3

SEARCH FREQUENCY DATA TABLE 41

| Keyword | Search frequency (Times/Month) |
|---|---|
| J company travel site | 5,548,504 |
| January | 35,187 |
| 24 | 3,235 |
| Tokyo | 256,879 |
| Minato ward | 45,231 |
| accommodation | 324,356 |
| ⋮ | ⋮ |

SYSTEM, METHOD, AND PROGRAM FOR SEARCH

TECHNICAL FIELD

The present invention relates to a system, a method, and a program for search.

BACKGROUND ART

In the Internet search, a keyword is typically input in a search text input area. In such search, to easily find the target site, for example, inputting two or more keywords or a text in the search text input area is known.

Moreover, as Non-Patent Document 1, specifying the keyword condition (find pages with all these words, this exact word or phrase, any of these words, none of these words, numbers range, or the like) and narrowing the search result by (language, region, last update, domain, file type, or the like) to improve the search accuracy are known.

CITATION LIST

Non-Patent Literature

Non-Patent Document 1: Google Advanced Search, https://www.google.co.jp/advanced_search

SUMMARY OF INVENTION

However, these are used to improve the accuracy of search from a number of web pages in the world and not to obtain predetermined information on the page that a specific site provides.

For example, a person who wishes to make a travel reservation often has the days to stay, the destination, the number of accompanies, etc., in the person's mind when searching web pages. In this case, this person does not search web pages to obtain company information in the web sites of travel agencies but to obtain information on the candidate travel plans in a predetermined schedule.

In a conventional technology, a person who wishes to make a travel reservation inputs a keyword (e.g. company name that provides a web page) in a search text input area to hit the top page of the web site of a travel agency, so that the person can accurately hit the top page from a number of web pages in the world. However, in a conventional technology, a person who wishes to make a travel reservation needs additional operations to look for the reservation form the top page and to input the days to stay, the destination, the number of accompanies, etc., in the reservation form. Without the additional operations, the person cannot obtain information on the candidate travel plans in a predetermined schedule.

If one search operation not only accurately hits information on the top page of the web site of a travel agency but also provides information on the candidate travel plans from the pages that the web site provides, a person who wishes to make a travel reservation can reach more quickly the really intended target web page.

In view of such demands, an objective of the present invention is to not only hit a specific site but also provide information that the user really intends to search from the pages that a specific site provides with less search operations, in the search from a number of web pages in the world.

The first aspect of the present invention provides a system for searching the Internet, including:

an input receiving unit that receives input of a predetermined keyword and argument from a user;

a specifying unit that specifies a web site based on the keyword; and an argument-related page display unit that displays a page relating to the argument in the web site.

According to the first aspect of the present invention, the input receiving unit receives input of a predetermined keyword and argument from a user, the specifying unit that specifies a web site based on the keyword that the input receiving unit has received, and the argument-related page display unit displays a page relating to the argument that the input receiving unit has received in the web site that the specifying unit has specified.

Therefore, the present invention can not only hit a specified site based on the predetermined keyword that the input receiving unit has received but also provide information on the argument that the input receiving unit that has received, in other words, information that the user really intends to search from the pages that a specified web site provides with less search operations, in the search from a number of web pages in the world The second aspect of the present invention provides the system according to the first aspect of the present invention, further including:

an argument transmission unit that transmits the argument to a computer that provides the web site; and an argument-related page search unit that searches a page relating to the argument, in which the argument-related page display unit displays the page searched by the argument-related page search unit.

According to the second aspect of the present invention, the page searched from the pages that the specific web site by the argument-related page search unit based on the argument that the input receiving unit has received is displayed. Therefore, the information displayed by the argument-related page display unit is more likely to be the information that the user really intends to search.

The third aspect of the present invention provides the system according to the second aspect of the present invention, in which, if there are a plurality of arguments, the argument-related page search unit divides the plurality of arguments and searches the page relating to the arguments.

According to the third aspect of the present invention, if there are a plurality of arguments, the arguments are divided, and the common pages related to the divided arguments are searched. Therefore, the information displayed by the argument-related page display unit is more likely to be the information that the user really intends to search.

The fourth aspect of the present invention provides the system according to any one of the first to the third aspects of the present invention, in which the keyword and the argument are a character string.

According to the fourth aspect of the present invention, the user only has to serially input a predetermined keyword and argument. This is more convenient for the user.

According to the fifth aspect of the present invention provides the system according to the fourth aspect of the present invention, further including a separation unit that separates the keyword and the argument from the character string based on the search frequency.

According to the fifth aspect of the present invention, the keyword and the argument are separated from the character string based on the search frequency. This can prevent the misrecognition and the false search in which a keyword and an argument are mixed up in the character string. Therefore, the information displayed by the argument-related page display unit is more likely to be the information that the user really intends to search.

The present invention can not only hit a specific site but also provide information that the user really intends to search from the pages that a specific site provides with less search operations, in the search from a number of web pages in the world.

BRIEF DESCRIPTION OF DRAWINGS

FIG. 3 shows an example of the search frequency data table 41 according to the embodiment.

DESCRIPTION OF EMBODIMENTS

Embodiments of the present invention will be described below with reference to the attached drawings. However, this is illustrative only, and the technological scope of the present invention is not limited thereto.

Configuration of System for Search 1

Figure 1:
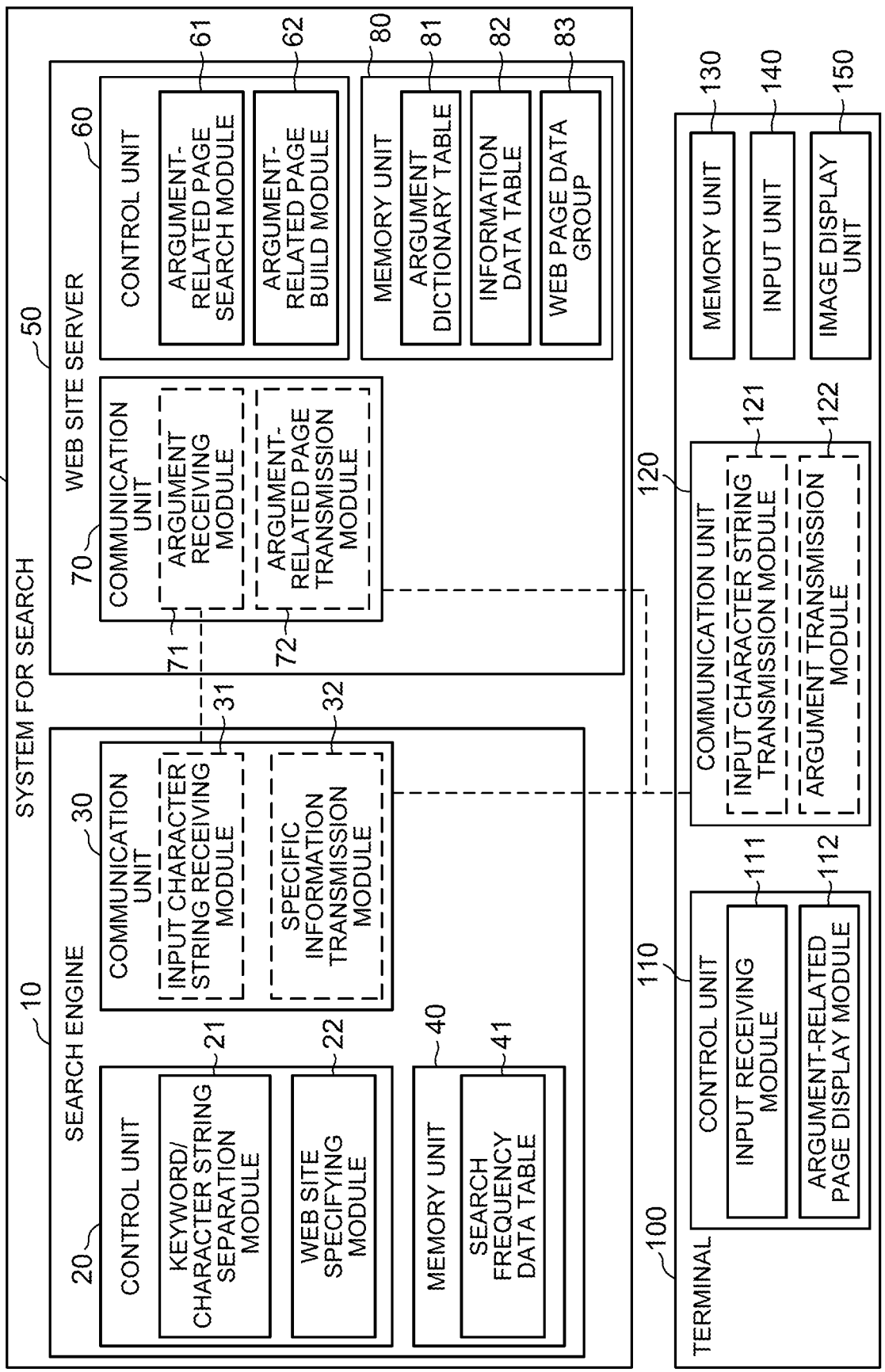
FIG. 1 shows a block diagram illustrating a hardware configuration and a software function of the system for search 1 in an embodiment.

FIG. 1 shows a block diagram illustrating a hardware configuration and a software function of the system for search 1 in an embodiment.

The system for search 1 includes a search engine 10 that is managed by the provider of the search engine, which provides information to access the web site that the user intends among a number of web sites, a web site server 50 that is managed by the provider of the web site, which provides various kinds of information including reservation information such as hotel information and conference room information, and a terminal 100 that the user uses. The search engine 10, the web site server 50, and the terminal 100 are connected through a network.

Search Engine 10

The search engine 10 at least includes a control unit 20 to control data, a communication unit 30 to communicate with other devices, and a memory unit 40 to store data.

The control unit 20 includes a central processing unit (hereinafter referred to as "CPU"), a random access memory (hereinafter referred to as "RAM"), and a read only memory (hereinafter referred to as "ROM").

The communication unit 30 includes a device that is communicative to other devices, such as a Wireless Fidelity (Wi-Fi®) enabled device complying with, for example, IEEE 802.11.

The control unit 20 reads a predetermined program to achieve a keyword/character string separation module 21 and a web site specifying module 22.

Moreover, the control unit 20 reads a predetermined program to achieve an input character string receiving module 31 and a specific information transmission module 32 in cooperation with the communication unit 30.

The memory unit 40 is to store data and files and includes a data storage unit such as a hard disk, a semiconductor memory, a record medium, or a memory card. The memory unit 40 stores the search frequency data table 41 to be described later.

Web Site Server 50

The web site server 50 at least includes a control unit 60 to control data, a communication unit 70 to communicate with other devices, and a memory unit 80 to store data.

The control unit 60 includes a CPU, a RAM, and a ROM in the same way as the control unit 20.

The communication unit 70 includes a device that is communicative with other devices in the same way as the communication unit 30.

The control unit 60 reads a predetermined program from the memory unit 80 to achieve an argument-related page search module 61 and an argument-related page build module 62.

Moreover, the control unit 60 reads a predetermined program to achieve an argument receiving module 71 and an argument-related page transmission module 72 in cooperation with the communication unit 70.

The memory unit 80 includes a data storage unit such as a hard disk, a semiconductor memory, a record medium, or a memory card in the same way as the memory unit 40. The memory unit 80 stores the argument dictionary table 81 and the information database 82 that are to be described later. The memory unit 80 also stores data group on web page images (web page data group 83) necessary to display on the image display unit 150 of the terminal 100.

Terminal 100

The search engine 10 and the web site server 50 are connected with the terminal 100 through a network.

The type of the terminal 100 is not limited in particular. Examples of the terminal 100 include computer devices such as a personal computer and a smart phone.

The terminal 100 at least includes a control unit 110 that controls data, a communication unit 120 that communicates with other devices, a memory unit 130 that stores data, an input unit 140 that receives operation from the user, and an image display unit 150 that outputs and displays the data and images controlled by the control unit 110.

The control unit 110 includes a CPU, a RAM, and a ROM in the same way as the control unit 20, etc.

The communication unit 120 includes a device that is communicative with other devices in the same way as the communication unit 30, etc.

The control unit 110 reads a predetermined program from the memory unit 130 to achieve an input receiving module 111 and an argument-related page display module 112.

Moreover, the control unit 110 reads a predetermined program to achieve an input character string transmission module 121 and an argument transmission module 122 in cooperation with the communication unit 120.

The memory unit 130 includes a data storage unit such as a hard disk, a semiconductor memory, a record medium, or a memory card in the same way as the memory unit 40, etc.

The type of the input unit 140 is not limited in particular. Examples of the input unit 140 include a keyboard, a mouse, and a touch panel.

The type of the image display unit 150 is not limited in particular. Examples of the image display unit 150 include a monitor and a touch panel.

Flow Chart Illustrating how to Search Internet by Using System for Search 1

Figure 2:
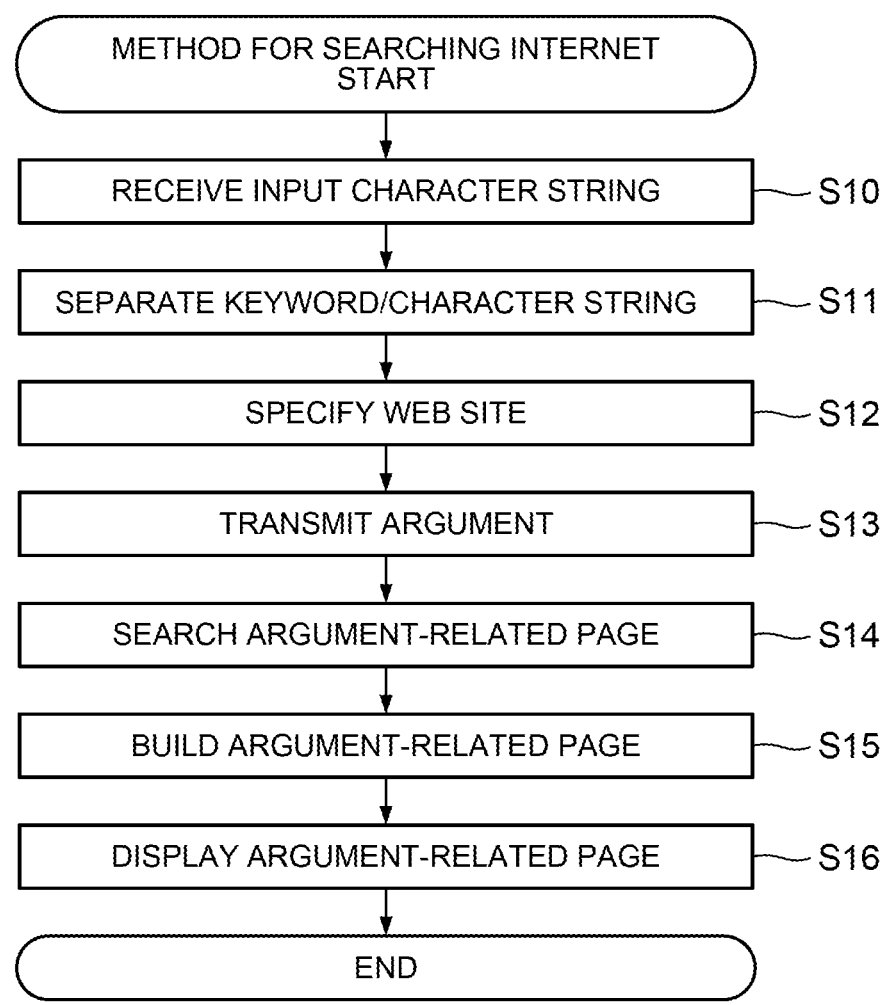
FIG. 2 shows a flow chart illustrating how to search the Internet in the embodiment.

FIG. 2 shows a flow chart illustrating how to search the Internet by using the system for search 1. The tasks executed by the modules of the above-mentioned hardware and software will be described below.

Step S10: Receive Input Character String

The control unit 110 of the terminal 100 performs the input receiving module 111 to receive an input character string from the user (step S10).

Specifically, the step S10 is performed through the following processes.

Start Web Browser

The control unit 110 of the terminal 100 starts the web browser according to the user's operation of the terminal 100.

Access Search Engine 10

The control unit 110 of the terminal 100 accesses the search engine 10 through the web browser according to the user's operation of the terminal 100. Then, the search text input area for the user to input a character string is displayed on the image display unit 150 of the terminal 110.

Input Character String

The user inputs a character string in the search text input area. The control unit 110 of the terminal 100 reads a predetermined program from the memory unit 130 and performs the input receiving module 111 to receive the character string input by the user.

The character string is not limited in particular as long as it contains a keyword and an argument. In this embodiment, the "keyword" is a phrase, a sign, etc., that is a clue when the control unit 20 of the search engine 10 searches for the web site that the user intends to acquire from a number of web sites in the world and provides the searched web site to the user. The "argument" is a phrase, a sign, etc., that is a clue when the control unit 60 of the web site server 50 builds a web page that corresponds to the information that the user intends to acquire from a number of data groups stored in the memory unit 80 of the web site server 50 and provides the web page to the user.

For example, the character string input in the search text input area is assumed to be "J company travel site January 24 Tokyo Minato Ward accommodation." In the character string, "J company travel site" is the web site that the user intends to acquire from a number of web sites in the world. In other words, "J company travel site" is a phrase that is a clue when the control unit 20 of the search engine 10 searches for the web site that the user intends to acquire from a number of web sites in the world and provides the searched web site to the user. Therefore, "J company travel site" is a "keyword" in this embodiment.

In the above-mentioned character string, "January," "24," "Tokyo," "Minato ward," and "accommodation" are words to make up a phrase that is a clue for the user to acquire information on "accommodation in Minato ward, Tokyo on January 24" from a number of data groups stored in the memory unit 80 of the web site server 50. Therefore, "January," "24," "Tokyo," "Minato ward," and "accommodation" are arguments in this embodiment.

Moreover, for example, the character string input in the search text input area is assumed to be "groupware A conference room B December 3 10 o'clock scheduled." In the character string, "groupware A" is the web site that the user intends to acquire from a number of web sites in the world. In other words, "groupware A" is a phrase that is a clue when the control unit 20 of the search engine 10 searches for the web site that the user intends to acquire from a number of web sites in the world and provides the searched web site to the user. Therefore, "groupware A" is a "keyword" in this embodiment.

In the above-mentioned character string, "conference room B," "December 3," "10 o'clock," and "scheduled" are words to make up a phrase that is a clue for the user to acquire information on "conference room B is scheduled to be used at 10 o'clock on December 3" among a number of data groups stored in the memory unit 80 of the web site server 50. Therefore, "conference room B," "December 3," "10 o'clock," and "scheduled" are arguments in this embodiment.

The number of keywords contained in a character string may be one or may be two or more. The number of arguments contained in a character string may also be one or may be two or more.

Furthermore, as "J company travel site January 24 Tokyo Minato Ward accommodation," spaces (blanks) may be inserted between phrases, signs, etc., that indicate a keyword and arguments contained in a character string to clarify the boundary between the phrases, the signs, etc. Alternatively, as "JcompanytravelsiteJanuary24TokyoMinatoWardaccomonadion," a keyword and arguments contained in a character string may be continuous (unbroken). Since a keyword and arguments can be serially input, the user only has to continuously (unbrokenly) input a predetermined keyword and argument in the search text input area. This is more convenient for the user.

To illuminate the invention described in this embodiment, "JcompanytravelsiteJanuary24TokyoMinatoWardaccomonadion" is assumed to be input in the search text input area in the following description unless otherwise specified.

Transmit Character String

The control unit 110 of the terminal 100 reads a predetermined program from the memory unit 130 to perform the input character string transmission module 121 in cooperation with the communication unit 120. Then, the information on the character string input by the user is transmitted to the search engine 10.

The control unit 20 of the search engine 10 reads a predetermined program from the memory unit 40 to perform the input character string receiving module 31 in cooperation with the communication unit 30. The input character string receiving module 31 is performed to enable the control unit 20 to acquire information on the character string transmitted from the input character string transmission module 121.

Step S11: Separate Keyword/Character String

The control unit 20 of the search engine 10 reads a predetermined program from the memory unit 40 to perform the keyword/character string separation module 21, so as to separate a keyword and an argument from the character string transmitted from the terminal 100.

The method of separating a keyword and an argument from a character string is not limited in particular. Examples of this method will be described below.

Divide Character String

The control unit 20 divides the character string transmitted from the terminal 100 into terms or phrases. For example, the control unit 20 divides the character string "JcompanytravelsiteJanuary24TokyoMinatoWardaccomonadion" transmitted from the terminal 100 into "J company travel site," "January," "24," "Tokyo," "Minato ward," and "accommodation."

Count Search Frequency

The control unit 20 reads the search frequency data table 41 from the memory unit 40 and counts the number of times the divided terms or phrases have been searched for the last one month as search keywords.

FIG. 3 shows an example of the search frequency data table 41. The search frequency data table 41 stores the association of a keyword searched by using the search engine 10 for the last one month with the number of times the keyword has been used for the last one month.

FIG. 3 shows that the search frequency of "J company travel site" from the character string "JcompanytravelsiteJanuary24TokyoMinatoWardaccomonadion" transmitted from the terminal 100 is 5,548,504 times for the last one month. In the same way, the search frequencies of "January," "24," "Tokyo," "Minato ward," and "accommodation" are 35,187, 3,235, 256,879, 45,231, and 324,536 times, respectively.

Separate Keyword and Argument

The control unit 20 separates the character string into a keyword and an argument based on the search frequency.

In FIG. 3, the search frequency of "J company travel site" in the last one month exceeds 10 times more than those of other terms "January," "24," "Tokyo," "Minato ward," and "accommodation." As the result, the control unit 20 separates "J company travel site" as a keyword and other terms ("January," "24," "Tokyo," "Minato Ward," and "accommodation") as arguments from the character string.

Separating the keyword and the argument from the character string based on the search frequency as described above can prevent the misrecognition and the false search in which a keyword and an argument are mixed up in the character string.

Step S12: Specify Web Site

The control unit 20 of the search engine 10 specifies the web site relating to the term or the phrase that is separated as a keyword in the step S11.

In the example of this embodiment, the control unit 20 separates "J company travel site" from the character string "JcompanytravelsiteJanuary24TokyoMinatoWardaccomonadion" transmitted from the terminal 100. Then, the control unit 20 specifies a web site relating to "J company travel site" as the web site that the user intends to acquire from a number of web sites in the world.

The control unit 20 reads a predetermined program from the memory unit 40 to perform the specific information transmission module 32 in cooperation with the communication unit 30. In this example, that the control unit 20 has (i) separated "J company travel site" as a keyword and other terms ("January," "24," "Tokyo," "Minato Ward," and "accommodation") as arguments from the character string "JcompanytravelsiteJanuary24TokyoMinatoWardaccomonadion" and that (ii) "J company travel site" is specified as the web site that the user intends is to be transmitted to the terminal 70.

Step S13: Transmit Argument

The control unit 110 of the terminal 100 reads a predetermined program from the memory unit 130 to perform the argument transmission module 122 in cooperation with the communication unit 120. Then, information on the terms or the phrases separated as arguments is transmitted to the web site server 50 that manages the web site specified by the control unit 20 of the search engine 10.

For example, the argument transmission module 122 is performed to transmit the information indicating that the terms "January," "24," "Tokyo," "Minato Ward," and "accommodation" are separated as arguments to the web site server 50 relating to the "J company travel site" specified by the control unit 20 of the search engine 10.

Then, the control unit 60 of the web site server 50 reads a predetermined program from the memory unit 80 to perform the argument receiving module 71 in cooperation with the communication unit 70. The argument receiving module 71 is performed to enable the control unit 60 to acquire the information on the arguments transmitted by performing the argument transmission module 121.

In this embodiment, the information on the argument separated by the search engine 10 is transmitted to the terminal 100 and then from the terminal 100 to the web site server 50 to prevent the change from the existing programs of the search engine 10. However, the present invention is not limited to this. To reduce the number of processing steps, the information on the arguments separated by the search engine 10 may be directly transmitted from the search engine 10 to the web site server 50.

Step S14: Search Argument-Related Page

The control unit 60 of the web site server 50 reads a predetermined program from the memory unit 80 to perform the argument-related page search module 61. Then, the page relating to the argument is searched based on the argument that the control unit 60 has acquired.

The page relating to the argument is searched in the following way.

Read Argument Dictionary Table 81

The control unit 60 reads the argument dictionary table 81 stored in the memory unit 80 to categorize the argument that the control unit 60 has acquired. The data stored in the argument dictionary table 81 is different depending on the information that the web site server 50 provides.

Figure 4:
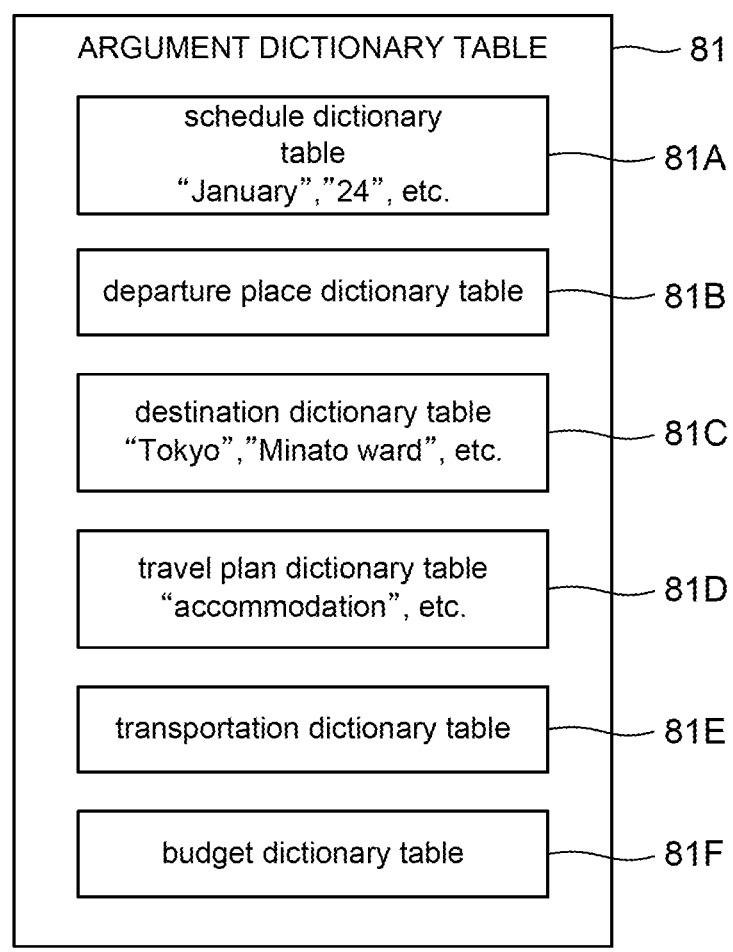
FIG. 4 shows an example of the argument dictionary table 81 according to the embodiment.

FIG. 4 shows an example image of the argument dictionary table 81 stored in the memory unit 80 of the web site server 50 relating to "J company travel site." The argument dictionary table 81 includes (i) the schedule dictionary table 81A that corresponds to a dictionary of the terms relating to a schedule including the departure date, the return date, and the travel period of a travel, (ii) the departure place dictionary table 81B that corresponds to a dictionary of the terms relating to the departure place of a travel, (iii) the destination dictionary table 81C that corresponds to a dictionary of the terms relating to the destination of a travel, (iv) the travel plan dictionary table 81D that corresponds to a dictionary of the terms relating to a travel plan including a package tour and an accommodation plan, (v) the transportation dictionary table 81E that corresponds to a dictionary of the terms relating to transportation including a railway, an airplane, and a bus, and (vi) the budget dictionary table 81F that corresponds to a dictionary of the terms relating to the budget for a travel.

For example, "January" and "24" contained the character string "JcompanytravelsiteJanuary24TokyoMinatoWardaccomonadion" are the terms relating to a schedule and thus stored in the schedule dictionary table 81A. "Tokyo" and "Minato Ward" are the terms relating to the departure place of a travel and thus stored in the destination dictionary table 81C. "Accommodation" is the term relating to a travel plan and thus stored in the travel plan dictionary table 81D.

In this embodiment, the data stored in the departure place dictionary table 81B are the same as those stored in the destination dictionary table 81C. If the argument that the control unit 60 has acquired contains only one region, the control unit 60 recognizes the region as the destination.

Since "January" and "24" contained the character string "JcompanytravelsiteJanuary24TokyoMinatoWardaccomonadion" are stored in the schedule dictionary table 81A, the control unit 60 can recognize the terms categorized in the schedule of a travel by reading the argument dictionary table 81. Furthermore, since "Tokyo" and "Minato Ward" are stored in the destination dictionary table 81C, the control unit 60 can recognize the terms categorized in the destination of a travel. Furthermore, since "accommodation" is stored in the travel plan dictionary table 81D, the control unit 60 can recognize the terms categorized in a travel plan.

Set Search Condition

The control unit 60 sets the search condition. For example, the control unit 60 sets the search condition that the schedule of the travel is "January" and "24," the destination of the travel is "Tokyo" and "Minato Ward," and the travel plan is "accommodation."

Search Information that User Intends

The control unit 60 reads the information database 82 stored in the memory unit 80 to search information that the user intends based on the search condition set by the control unit 60.

The information database 82 stores various information groups to be provided to the user, such as information including package tours and accommodations that is not shown in the drawings. The control unit 60 can extract the information that meets the search condition set by the control unit 60 from a number of information groups stored in the information database 82.

If the number of arguments is two or more as described in the above-mentioned example, the two or more arguments are divided to search the information relating to the arguments. Therefore, the information extracted by the control unit 60 is more likely to be really searched by the user.

Step S15: Build Argument-Related Page

The control unit 60 of the web site server 50 reads a predetermined program from the memory unit 80 to perform the argument-related page build module 62. Then, the information to read the web page that corresponds to the search result based on the search condition including the argument that the control unit 60 has acquired can be built as an argument-related page.

An argument-related page is build when the control unit 60 reads the web page data group 83 stored in the memory unit 80 and builds information to read the web page that corresponds to the search result obtained in the step S14.

The web page data group 83 includes the data group that indicates the configuration of the web site that the provider of the web site server 50 provides and the image data group that includes the components of the web site.

In the step S15, data necessary to display the web page that corresponds to the search result based on the search condition that the schedule of the travel is "January" and "24," the destination of the travel is "Tokyo" and "Minato Ward," and the travel plan is "accommodation" on the terminal 100 can be prepared.

Then, the control unit 60 of the web site server 50 reads a predetermined program from the memory unit 80 to perform the argument-related page transmission module 72 in cooperation with the communication unit 70. As the result, the information to read the argument-related page built by the control unit 60 is transmitted to the terminal 100.

Step S16: Display Argument-Related Page

The control unit 110 of the terminal 100 reads a predetermined program from the memory unit 130 to perform the argument-related page display module 112. Then, the information to read the web page that corresponds to the search result based on the search condition including the argument that the web site server 50 has acquired can be displayed on the image display unit 150 of the terminal 100 as high ranking in the search engine 10.

Operation and Working-Effect of the Present Invention

According to the invention described in this embodiment, the operation of the input receiving module 111 receives an input predetermined keyword and argument from the user. Then, the operation of the web site specifying module 22 specifies a web site relating to the keyword that the terminal 100 has received. Subsequently, the operation of the argument-related page display module 112 displays the page relating to the argument that the input receiving module 111 has received on the web site specified by the web site specifying module 22.

Therefore, the present invention can not only hit a specified site based on the predetermined keyword that the user has input but also provide the information on the argument that the input receiving module 111 has received, in other words, the information that the user really intends to search from the pages that the specified web site provides with less search operations, in the search from a number of web pages in the world.

Moreover, according to the invention described in this embodiment, the argument transmission module 122 that transmits the argument to the web site server 50 that provides a web site and the argument-related page search module 61 that searches a page relating to the argument are provided. The argument-related page display module 112 preferably performs the process that displays the page searched by the argument-related page search module 61. By performing the argument-related page display module 112, the information displayed on the image display unit 150 of the terminal 100 is more likely to be the information that the user really searches.

Moreover, according to the invention described in this embodiment, if the number of the arguments is two or more, the argument-related page search module 61 preferably performs the process that divides the arguments and searches the page relating to the argument. By performing the argument-related page display module 112, the information displayed on the image display unit 150 of the terminal 100 is more likely to be the information that the user really searches.

Moreover, according to the invention described in this embodiment, the system for search, in which the keyword and the argument are a character string, is preferably provided. Accordingly, the user only has to serially input a predetermined keyword and argument. This is more convenient for the user.

Moreover, according to the invention described in this embodiment, the keyword/character string separation module 21 that separates a keyword and an argument from a character string based on the search frequency is preferably further provided.

This can prevent the misrecognition and the false search in which a keyword and an argument are mixed up in the character string. Accordingly, by performing the argument-related page display module 112, the information displayed on the image display unit 150 of the terminal 100 is more likely to be the information that the user really searches.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for search
10 Search engine
20 Control unit
21 Keyword/character string separation module
22 Web site specifying module
30 Communication unit
31 Input character string receiving module
32 Specific information transmission module
40 Memory unit
41 Search frequency data table
50 Web site server
60 Control unit
61 Argument-related page search module
62 Argument-related page build module
70 Communication unit
71 Argument receiving module
72 Argument-related page transmission module
80 Memory unit
81 Argument dictionary table
82 Information database
83 Web page data group
100 Terminal
110 Control unit
111 Input receiving module
112 Argument-related page display module
120 Communication unit
121 Input character string transmission module
122 Argument transmission module
130 Memory unit
140 Input unit
150 Image display unit

What is claimed is:

1. A system for searching the Internet, comprising:
a first processor that:
   receives input of a character string from a user;
   separates a keyword and an argument from the character string based on a search frequency;
   specifies a web site based on the keyword; and
   displays a page relating to the argument in the web site,
wherein the first processor separates the keyword and the argument from the character string based on the search frequency after the input of the character string has been received, and
wherein the keyword indicates a term or phrase used to search for a web site which the user intends to acquire from web sites in world, and the arguments indicate a term or phrase used to build a page that corresponds to information that the user intends to acquire from data provided by the web site which the user intends to acquire.

2. The system according to claim 1, further comprising:
a communication device that transmits the argument to a computer that provides the web site; and
a second processor that searches the page relating to the argument in the web site,
wherein the first processor displays the page searched by the second processor.

3. The system according to claim 2, wherein, if there are a plurality of arguments, the second processor divides the plurality of arguments and searches the page relating to the arguments.

4. The system according to claim 1, wherein when the character string includes a plurality of terms or phrases for a reservation, the keyword includes a term or phrase indicating a web site provided by a company for the reservation, and the argument includes a term or phrase indicating a condition for the reservation.

5. The system according to claim 1, wherein when the search frequency of a first term or phrase included in the character string exceeds a predetermined times of the search frequency of a second term or phrase included in the character string, the first processor selects the first term or phrase as the keyword and the second term or phrase as the argument.

6. A method for searching the Internet, comprising:
receiving an input of a character string from a user;
separating a keyword and an argument from the character string based on a search frequency;
specifying a web site based on the keyword; and
displaying a page relating to the argument in the web site,
wherein the keyword and the argument are separated from the character string after the input of the character string has been received, and
wherein the keyword indicates a term or phrase used to search for a web site which the user intends to acquire from web sites in world, and the arguments indicate a term or phrase used to build a page that corresponds to information that the user intends to acquire from data provided by the web site which the user intends to acquire.

7. The method according to claim 6, wherein when the character string includes a plurality of terms or phrases for a reservation, the keyword includes a term or phrase indicating a web site provided by a company for the reservation, and the argument includes a term or phrase indicating a condition for the reservation.

8. The method according to claim 6, wherein when the search frequency of a first term or phrase included in the character string exceeds a predetermined times of the search frequency of a second term or phrase included in the character string, the first processor selects the first term or phrase as the keyword and the second term or phrase as the argument.

9. A computer program product for use in a system for searching the Internet, comprising a non-transitory computer usable medium having a set of instructions physically embodied therein, the set of instructions including computer readable program code, which when executed by the system causes a processor to execute:
receiving an input of a character string from a user;
separating a keyword and an argument from the character string based on a search frequency;
specifying a web site based on the keyword; and
displaying a page relating to the argument in the web site,
wherein the keyword and the argument are separated from the character string after the input of the character string has been received, and
wherein the keyword indicates a term or phrase used to search for a web site which the user intends to acquire from web sites in world, and the arguments indicate a term or phrase used to build a page that corresponds to information that the user intends to acquire from data provided by the web site which the user intends to acquire.

10. The computer program product according to claim 9, wherein when the character string includes a plurality of terms or phrases for a reservation, the keyword includes a term or phrase indicating a web site provided by a company for the reservation, and the argument includes a term or phrase indicating a condition for the reservation.

11. The computer program product according to claim 9, wherein when the search frequency of a first term or phrase included in the character string exceeds a predetermined times of the search frequency of a second term or phrase included in the character string, the first processor selects the first term or phrase as the keyword and the second term or phrase as the argument.

* * * * *